United States Patent Office 3,010,928
Patented Nov. 28, 1961

3,010,928
RUBBERIZED BLOWN ASPHALT AND METHOD FOR MAKING SAME
Frank B. Odasz, Jr., Cody, Wyo., and John R. Hartwig, Bienfait, Saskatchewan, Canada, assignors to Husky Oil Company, Cody, Wyo., a corporation of Delaware
No Drawing. Filed June 18, 1959, Ser. No. 821,087
12 Claims. (Cl. 260—28.5)

The present invention relates to asphaltic compositions and, more particularly, to compositions consisting essentially of asphalt having minor proportions of rubber interblended therewith, or intimately dispersed therein, herein designated rubberized asphalt. The invention provides such asphaltic compositions having novel and highly useful physical and chemical properties and also provides a commercially practical and economical method for producing such compositions and for regulating and controlling the properties thereof.

This application is, in part, a continuation of our co-pending application Ser. No. 624,959, filed November 29, 1956, now abandoned.

It has heretofore been recognized that by properly interblending a natural or synthetic rubber with an unblown asphalt, a marked change in the physical properties of the asphalt, such as durability, ductility, adhesion, toughness and tenacity, can be obtained, resulting in a product definitely superior for many uses. It has also been proposed to disperse rubber in blown asphaltic compositions. However, where a blown asphalt has been so used, the physical characteristics of the resultant product have not heretofore been satisfactory, predictable or readily controllable.

The nature of such dispersions of rubber in asphalt is not fully understood. Microscopic examination of interblends of rubber and unblown asphalt has revealed the presence of discrete particles and threads of the rubber, suggesting that, in part at least, the dispersion is a physical admixture. However, it appears that a substantial portion of the rubber dispersed in the asphalt is more intimately blended therewith, as though dissolved in, or even chemically united with, the asphalt. It appears, more particularly, that the improved properties of the blend are primarily brought about by this more intimate association of the rubber and asphalt molecules, rather than by the less intimate dispersion of discrete particles or threads of the rubber in the asphalt. It has further been observed that where the asphaltic constituent does not have an affinity for, or capacity to absorb, the rubber in a manner akin to dissolving it, attempts to rubberize such asphalt have generally been unsuccessful.

A striking example of asphalts which do not normally have such an affinity for, or capacity to thus absorb, the rubber are the conventional, so-called blown asphalts. These blown asphalts normally have chemical characteristics or molecular structures which are considerably different from those of the cracked, straight-run or vacuum-reduced asphalts, which have heretofore been successfully rubberized. The blowing operations by which such blown asphalts are produced involves heating an asphalt, usually as an asphalt flux, to a temperature of about 400– 450° F. and oxidizing the mass by blowing air therethrough.

The result of this oxidation is a change in the nature of the entire mass and the purpose is normally that of producing a harder asphalt of higher softening point, usually of the order of 170° F. or higher. Other physical and chemical characteristics of the asphalt which have generally been changed by this blowing operation include the development of greater resistance to flow and weathering and the development of an apparently more negative affinity of the resultant blown asphalts for the various rubbers with which it has been attempted to blend them.

The increased softening points of these blown asphalts have made it necessary to heat them to a higher temperature in order to render the asphalt sufficiently fluid for ready mixing with the rubber, temperatures indeed so high as to cause injury to the rubber before it could be satisfactorily interblended with the hot blown asphalt.

The present invention provides an improved method of producing rubberized blown asphalts comprising a plurality of cooperating steps by which the beneficial effects of the interblending of rubber with the blown asphalt are readily, economically and more fully attained, resulting in rubberized blown asphalts having novel and highly useful properties and combinations of properties by which they are especially adapted to a wide range of commercial uses, including paper laminants, road building, crack fillers, waterproofing, plastic asphalts, primers, and the like, particularly where the low temperature characteristics of the asphaltic compositions are a major consideration.

By our improved process, the higher softening point of the blown asphalts is no longer a problem and the rubber is intimately interblended therewith without destruction of the desirable properties of the rubber, whether by depolymerization or objectionable copolymerization of the rubber molecules.

In previous attempts to produce rubberized blown asphalts, it has been proposed, for instance, to mix asbestos fibers, or the like, with the blown asphalt in a plastic state and thereafter mix a rubber latex with the resultant plastic asphaltic material. It has also been proposed to mix an aqueous rubber latex with an oil-in-water type emulsion of blown asphalt.

The process and product of our present invention are distinguished from those proposed in that we are here concerned with a rubberized blown asphalt which is substantially free from water and which consists essentially of a dispersion of rubber in blown asphalt without added mineral or vegetable fibers.

It has further been proposed to mix the latex with unblown asphalt, thereafter blowing the mixture. But to our knowledge, that procedure has not given results satisfactory for our purposes perhaps due, in part at least, to the subjecting of the rubber to excessive temperatures during the prolonged blowing operation.

We have found that the characteristics of the blown asphalt, prior to rubberizing, and the manner in which it is produced, and also the method by which the rubber is interblended with the asphalt, are of the utmost importance and cooperate to produce the desired novel results.

The nature of the base asphalt, i.e., the asphalt used in making the flux to be blown, does not appear to be critical. It may, for instance, be a natural asphalt or one produced from petroleum, such as the conventional, so-called cracked, vacuum-reduced or straight-run asphalts. Similarly, characteristics of the specific flux oil used is not critical and may be varied over a wide range. Likewise the blowing temperature and rate of blowing are not critical. Conventional blowing apparatus may be used. However, it is essential that the asphalt flux, prior to blowing, be adjusted to an SFS viscosity within the range of about 40 to about 300 at 210° F. preferably to about 75 to 175 SFS, and that this flux be air blown to a softening point within the range extending from about 80° to about 165° F., more advantageously 125°–150° F. We have found that the softening point to which the flux is blown is of primary importance in determining the characteristics of the resultant rubberized blown asphalt. We have found that where the flux is blown to a softening point in excess of about 165° F., the subsequent interblending with rubber does not bring about the desired change with respect to penetration, ductility and stain properties of the rubberized product, particularly those characteristics at low temperatures. Similarly where the asphalt flux is not blown to a softening point of at least as high as 80° F., the desired properties of the product are not obtained.

The characteristics, and combinations of characteristics, embodied in the resultant rubberized blown asphaltic compositions, produced in accordance with our present invention, may be varied over a surprising range to meet special requirements, as to (a) softening point temperature, (b) penetration at 77° F., (c) penetration at 32° F., (d) ductility at 77° F., (e) ductility at 39.2° F. and (f) stain characteristics, by varying the operating conditions and extent of the blowing step and the nature and proportion of the rubber interblended with the resultant blown asphalt, as hereinafter more fully described.

As previously noted, a second essential feature of our present invention is the manner in which the rubber is interblended with the resulting blown asphalt.

In accordance with our present process, this interblending is effected by introducing the rubber in the form of an aqueous latex into a molten body of the blown asphalt. In order to obtain the required more intimate association of the rubber and asphalt molecules, it is essential that the rubber of the latex be quickly, thoroughly and uniformly dispersed in the blown asphalt while the latter is in a molten, highly fluid condition.

The normally high melting point of blown asphalts requires that they be highly heated in order to bring them to such highly fluid condition, i.e., to temperatures considerably higher than those which the rubber can withstand. It is equally important, however, that the rubber not be subjected to thermal conditions by which the rubber is deleteriously affected, i.e., by depolymerization or copolymerization of the rubber molecules to non-elastic materials. Further, the blown asphalt should not be heated to temperatures at which the essential qualities of the blown asphalt are destroyed. Thus the rubberizing of blown asphalts has presented exceptionally difficult problems.

We have found that the desired intimate interblending of the rubber with blown asphalt can be satisfactorily and economically effected, without injury to either the rubber or the blown asphalt, by introducing the aqueous rubber latex into a flowing, confined body or stream of the blown asphalt, which at the point of such introduction, is at a temperature at which the asphalt is highly fluid, substantially in excess of that at which the rubber is deleteriously affected, but below that at which the blown asphalt is deleteriously affected, and such that the latex-water is quickly flashed into steam, causing violent agitation, and thereby atomizing and intimately dispersing the rubber solids of the latex in the hot asphalt, as described and claimed in Patent No. 2,921,105. Heat absorbed by the flashing of the latex-water into steam quickly lowers the temperature of the mixture to a safe temperature for the rubber before the rubber can be damaged. The resultant mixture of steam, blown asphalt and rubber is, with advantage, continued through the confining conduit for a brief period to insure uniform dispersion of the rubber solids throughout the asphalt and is then discharged into a vessel providing a free surface to permit disengagement of the steam from the mixture.

Where the resultant hot asphaltic mixture is relatively rapidly cooled, as in pilot plant operation in which relatively small volumes of the rubberized asphalt are involved, we have found it advantageous to stir the mixture vigorously as it cools through the temperature range of about 390° to 340° F. However, this stirring does not appear to be essential to the obtaining of a satisfactory, homogeneous product, particularly in large-scale commercial operations.

In copending application Ser. No. 535,600, filed September 21, 1955, now Patent 2,921,313 of which one of us is the applicant, there is described and claimed a process, similar to that described above, which we have found highly effective for carrying out the interblending step of our present process.

In accordance with the process of the last said copending application, the asphalt, at the point of introduction of the latex, is at a temperature so coordinated with the amount of water present in the selected proportion of the latex to be introduced, and the proportions and specific heat characteristics of the asphalt and of the rubber, that the temperature of the mixture is quickly reduced, primarily by evaporation of the latex-water, to below that at which the rubber is deleteriously affected, but above the foaming temperature of the mixture, e.g., not below about 325° F. By this procedure, the interblending and expelling of the latex-water are effected without forming objectionable, persistent foam or froth previously encountered in dewatering asphalt mixtures.

We have found that, where the procedure of the said copending application is used to carry out the inter-blending step of our present process, the initial temperature of the blown asphalt should be within the range of about 450° to about 600° F., depending upon the amount of latex-water to be evaporated, and that the temperature of the resultant mixture should fall to a temperature not below 325° F. preferably within the range extending from about 350° to about 400° F.

Accordingly, the interblending step of our present process may, with particular advantage, be effected by injecting, or otherwise introducing, the selected rubber latex, at a constant predetermined rate, into a body of the hot blown asphalt flowing at a constant rate as a confined stream, the proportion of latex so introduced being equivalent to the predetermined amount of rubber solids to be incorporated in the blown asphalt.

The temperature of the body of asphalt at the point where the latex is introduced must be sufficiently high to cause the latex-water to flash into steam upon contact with the asphalt, resulting in vigorous agitation and thereby effecting rapid dispersion and interblending of the rubber with the hot asphalt. The absorption of heat by the evaporation of the latex-water causes a sudden reduction in the temperature of the mixture to below that at which the rubber is deleteriously affected but not lower than the temperature at which the particular asphalt remains highly fluid.

As above indicated, the initial temperature of the asphalt should generally be within the range from about 450° F., to about 600° F. but should not exceed that at which the asphalt is injured. Usually, the initial temperature of the asphalt should be as high as permissible, with due consideration of the other requirements previously noted and, particularly, the proportion of latex-water to be evaporated. The proportion of water present in the latex used may be varied over a considerable range and may, with advantage, be so coordinated with the initial temperature of the asphalt as to produce the desired temperature drop.

By this method of interblending, the dispersing of the rubber in the molten blown asphalt and the reduction in temperature of the mixture are accomplished so rapidly that while full advantage is taken of the high temperature in promoting the desired intimate interblending, the period of time during which the rubber is subjected to such high temperature is so brief as to avoid damaging the rubber.

The resultant mixture of asphalt, rubber and steam, still in a highly fluid condition, is continued as a confined flowing stream for a period sufficient to assure uniform dispersion of the rubber throughout the asphalt and the mixture is then passed to an open vessel, or other chamber, adapted to the disengaging of the steam from the mixture. In order to expedite this disengagement of the steam, it is especially desirable that, in accordance with the above-noted copending application Ser. No. 535,600, the initial temperature of the asphalt should be so coordinated with the amount of latex-water to be vaporized that the temperature of the mixture not fall below its foaming temperature, preferably not below 325° F.

Though the previously described methods of carrying out the interblending steps have been found to give especially satisfactory results, other methods of carrying out this step, which involve rapid mixing of the rubber with the blown asphalt while the latter is in a molten, highly fluid condition preferably at a temperature in excess of about 450° F., and a sudden reduction of the temperature to below that at which the rubber is injured, may be employed.

In conjunction with this interblending step just described, we have found that the manner in which the blown asphalt is prepared profoundly affects the characteristics of the resultant rubberized blown asphalt. We have further found that the type and proportion of latex used markedly influence the characteristics of the product.

We have, with particular advantage, used aqueous latices of synthetic rubbers of the neoprene type and of the GRS (butadiene-styrene) type in proportions within a range equivalent to about 0.5% to about 5% of rubber solids, based on the weight of the asphalt, and the invention will be more particularly illustrated with reference to those particular synthetic rubbers. However, it will be understood that the invention also contemplates the use of natural rubber in latex form, and even in excess of 5% of the natural or synthetic rubber solids.

For producing rubberized blown asphalt compositions especially suited for use as joint or crack fillers and the like, we have, with particular advantage, interblended with the blown asphalt synthetic rubbers of the type just noted in proportions within the range of about 2.5% to about 4.5%. Similarly, in producing rubberized blown asphaltic compositions especially suited for use as paper laminants, we have found proportions of these synthetic rubbers within the range of about 0.5 to about 3% to be particularly advantageous.

As we have previously noted, the usual purpose of air blowing an asphalt is to increase its hardness, to increase its softening point temperature and reduce penetration at ordinary temperatures, at 77° F., for instance. However, we are here particularly concerned with the production of an air blown asphalt especially amenable to interblending with rubber for the production of rubberized asphalts having novel and highly desirable low temperature characteristics, as indicated, for instance by penetration values at 32° F. and ductility at 39.2° F. These characteristics have not heretofore been predictable from the softening point and penetrations at normal temperatures of the blown asphalt constituent. To our knowledge, there has not heretofore been available a satisfactory method or dependable criteria for producing rubberized blown asphalt compositions of the desired low temperature properties.

We have found, as previously noted, that asphalts especially suited for our purpose are produced by air-blowing an asphalt flux having a viscosity within the range of about 40 to about 300 SFS, at 210° F., to a softening point not in excess of about 165° F. and not less than about 80° F. The preparation of the flux to be blown is subject to considerable variation as to the nature of the flux oil and characteristics and origin of the base asphalt, as previously noted herein. In the specific examples hereinafter shown, as illustrations of our invention, we have used a petroleum vacuum distilled asphalt, derived from a Wyoming Block crude and as the flux oil, we have used a viscous petroleum oil fraction such as conventionally used for that purpose, namely, one having an A.P.I. gravity within the range of 11–20. The proportion of the flux oil added will, of course, be determined by the nature of the base asphalt and the desired flux viscosity.

By varying the initial flux viscosity and the softening point to which the flux is blown, within the above prescribed ranges, marked variation in the properties of the rubberized blown asphalt may be effected, as hereinafter illustrated. Another condition materially affecting the characteristics of the rubberized product is whether or not a blowing catalyst is used.

In accordance with the process of our present application, the blowing operation is carried on in the presence of a catalytic proportion of $P_2O_5$, advantageously within the range of about 0.5% to about 2.5%. We have with particular advantage used about 1.5% by weight.

In our related copending applications, Serial No. 821,085 and Serial No. 821,086, filed concurrently herewith, the blowing step is effected in the absence of a blowing catalyst and in the presence of a sulphur catalyst, respectively.

The way in which the characteristics and combinations of properties of the resultant rubberized blown asphalt may be varied in accordance with our present process is illustrated by a series of runs, the characteristics of the products of which are set forth in the following Table I. For purposes of more accurate comparison, the variables in the respective operations have been restricted to a minimum. It will be understood, however, that the invention is not limited in scope to the particular conditions and products of this series of runs.

In each case, the base asphalt was a conventional vacuum reduced Wyoming petroleum asphalt having a penetration of about 265 dmm. at 77° F., cut to the indicated flux viscosity by incorporating therein, before blowing, a gas oil of an A.P.I. viscosity of 11.4. The blowing temperature in each case was 450° F., and the blowing was continued, in the presence of 1.5% $P_2O_5$ until the softening points indicated in Table I were obtained. Separate portions of each batch of the blown asphalts were then rubberized by interblending therewith proportions of neoprene latex 735 and proportions of GRS 2006 (butadiene-styrene) rubber latex, respectively, equivalent to the percentages of rubber solids set forth in Table I, and the physical characteristics of the unrubberized blown asphalt and of the respective rubberized blown asphalts produced therefrom, as determined by conventional methods, were as recorded. The stain properties of the rubberized blown asphalts are also included in the tabulation.

In each of the interblending operations, the latex was rapidly mixed with the blown asphalt preheated to a temperature at which it was in a molten, highly fluid condition and such that the latex-water was quickly flashed into steam causing intimate dispersion of the rubber solids in the hot asphalt and lowering the temperature of the dispersion, as hereinbefore described.

Table I

| Blown asphalt | Flux vis. at 210° F. | Blown to S.P. | Increase in S.P., ° F. | | | | Penetration at 77° F. | | | | | Penetration at 32° F. | | | | |
|---|---|---|---|---|---|---|---|---|---|---|---|---|---|---|---|---|
| | | | Neoprene | | GRS | | None | Neoprene | | GRS | | None | Neoprene | | GRS | |
| | | | 2.1% | 4.2% | 2.1% | 4.2% | | 2.1% | 4.2% | 2.1% | 4.2% | | 2.1% | 4.2% | 2.1% | 4.2% |
| 1 | 42 | 96 | 32 | 80 | 54 | 39 | 410 | 260 | 228 | 248 | 213 | 300+ | 214 | 153 | 163 | 190 |
| 2 | 42 | 133 | 39 | 96 | 73 | 35 | 284 | 179 | 140 | 139 | 186 | 158 | 117 | 105 | 98 | 134 |
| 3 | 42 | 157 | 60 | 110 | 73 | 63 | 173 | 115 | 80 | 91 | 100 | 105 | 75 | 44 | 68 | 75 |
| 4 | 111 | 107 | 18 | 61 | 35 | 49 | 310 | 242 | 167 | 190 | 148 | 165 | 112 | 78 | 99 | 94 |
| 5 | 111 | 126 | 29 | 65 | 53 | 81 | 194 | 144 | 130 | 136 | 112 | 138 | 70 | 74 | 73 | 69 |
| 6 | 111 | 150 | 47 | 59 | 58 | 82 | 125 | 93 | 89 | 88 | 78 | 65 | 55 | 65 | 62 | 53 |
| 7 | 302 | 105 | 6 | 21 | 15 | 31 | 230 | 214 | 187 | 186 | 141 | 76 | 63 | 64 | 66 | 65 |
| 8 | 302 | 128 | 18 | 39 | 32 | 52 | 104 | 92 | 84 | 89 | 78 | 49 | 43 | 37 | 36 | 36 |
| 9 | 302 | 152 | 23 | 48 | 48 | 60 | 65 | 59 | 58 | 58 | 52 | 32 | 29 | 33 | 29 | 31 |

| Blown asphalt | Ductility at 77° F. | | | | | Ductility at 39.2° F. | | | | | Stain | | | | |
|---|---|---|---|---|---|---|---|---|---|---|---|---|---|---|---|
| | None | Neoprene | | GRS | | None | Neoprene | | GRS | | None | Neoprene | | GRS | |
| | | 2.1% | 4.2% | 2.1% | 4.2% | | 2.1% | 4.2% | 2.1% | 4.2% | | 2.1% | 4.2% | 2.1% | 4.2% |
| 1 | 49 | 30 | 30 | ---- | ---- | 21.9 | 14 | 20 | ---- | ---- | 69 | 65 | 60 | 65 | 63 |
| 2 | 9.0 | 18 | 24 | ---- | ---- | 7.1 | 11 | 16 | ---- | ---- | 63 | 57 | 57 | 40 | 42 |
| 3 | 4.8 | 15 | 18 | ---- | ---- | 5.2 | 11 | 15 | ---- | ---- | 59 | 56 | 52 | 43 | 48 |
| 4 | 51 | 56 | 150 | 32 | 80 | 26.1 | 36 | 61 | 83 | 83 | 63 | 46 | 44 | 60 | 37 |
| 5 | 18.0 | 39 | 38 | 29 | 26 | 14.2 | 29 | 38 | 110 | 63 | 49 | 43 | 42 | 36 | 47 |
| 6 | 8.0 | 25 | 26 | 16 | 19 | 6.8 | 19 | 23 | 39 | 48 | 44 | 42 | 42 | 56 | 46 |
| 7 | 77 | 150+ | 150+ | 150+ | 150+ | 115 | 77 | 121 | 150+ | 150+ | 76 | 54 | 54 | 38 | 33 |
| 8 | 49 | 96 | 150 | 42 | 27 | 12.7 | 33 | 70 | 150+ | 60 | 46 | 40 | 39 | 38 | 33 |
| 9 | 13.2 | 131 | 109 | 22 | 20 | 5.7 | 20 | 61 | 24 | 18 | 41 | 37 | 35 | 35 | 34 |

As appears from the foregoing tabulation, the softening point of the rubberized blown asphalt is generally increased as the percentage of the rubber interblended therein is increased. By using the $P_2O_5$ catalyst in the blowing operation, other conditions remaining constant, the rate of increase is much greater than otherwise obtained. In general, the rate of increase in softening point has been found to increase as the viscosity of the asphalt flux, prior to blowing, is decreased. This rate of increase of softening point has also been found to increase with an increase in softening point to which the asphalt is blown. In other words, we have found that as the viscosity of the asphalt flux approaches the lower limit of the prescribed range and the softening point to which it is blown is increased, there is a more rapid increase in the softening point of the product as the proportion of rubber interblended therewith is increased. In this respect, GRS rubber has been found to be more effective than neoprene rubber.

Significant independent variables in the blowing step are, therefore, the initial flux viscosity and the softening point to which the asphalt is blown. The higher the softening point to which the asphalt is blown, the lower the penetration of the rubberized blown asphalt at 77° F. An increase in the porportion of rubber added has been found to cause a decrease in the peneration at 77° F. of the resultant rubberized blown asphalt. Where the lower flux viscosities are used, the rate of decrease in penetration, as the proportion of rubber is increased, is greatest up to a proportion of about 2% rubber than it is as the proportion is further increased. Except for the higher flux viscosities, this is not a straight-line relationship. If penetration be plotted against percentage of rubber, the resultant curve is found to be concave downwardly, particularly where the flux viscosity approaches the lower limit of the prescribed range. However, as the flux viscosity is increased, the relationship becomes more nearly a straight-line function.

The penetration of the resultant rubberized blown asphalt at 32° F. is likewise largely dependent upon the viscosity of the asphalt flux and the softening point to which it is blown. As the softening point of the unrubberized asphalt is increased, the penetration of the rubberized asphalt of 32° F. has been found to decrease. Also, as the flux viscosity approaches the lower limit of the prescribed range, the rate of decrease in the penetration of the rubberized asphalt at 32° F., upon increasing the proportion of rubber interblended therewith, has been found to increase.

The use of the $P_2O_5$ catalyst in the blowing operation has been found materially to increase the rate of such decrease in the low temperature penetration. The higher the penetration of the unrubberized asphalt at 32° F., the greater will be the decrease in low temperature penetration in proportion to the amount of rubber interblnded therewith. Neoprene rubber has been generally found to be more effective in decreasing low temperature penetration than in GRS rubber.

The ductility of the rubberized product at 77° F. has been found to increase generally as the proportion of rubber is increased. In this respect, neoprene rubber is more effective than GRS. We have found that, other conditions maintaining constant, the higher the flux viscosity and the lower the softening point to which the flux is blown, the greater will be the rate of increase in ductility of the rubberized asphalt at 77° F. as the proportion of rubber is increased.

Of particular interest, is the ductility of the product at 39.2° F. This is generally increased as the proportion of rubber is increased. The higher the flux viscosity and the lower the softening point to which it is blown, the greater will be the rate of increase in low temperature ductility as the proportion of rubber is increased. We have found, however, most surprisingly, that where GRS rubber is used, low temperature ductility increases rapidly as the proportion of rubber is increased up to a maximum of about 2% and then falls off decidedly. This is particularly true where the viscosity of the blowing flux approaches the upper limit of the prescribed range and is blown to a softening point of about 125° F.

A striking reversal of this relationship has been found to follow where the rubber constitutent is neoprene.

There, where the higher flux viscosities are used and are blown to a softening point of about 100° F., interblending of the rubber in proportions up to about 2% have been found to cause a striking decrease in low temperature ductility and further proportions of the rubber causes the low temperature ductility to increase again to only slightly above the low temperature ductility of the unrubberized asphalt.

For controlling the stain properties of the rubberized blown asphalt, which are of particular importance where the product is to be used as a paper laminant, for instance, of primary importance is the softening point to which the asphalt is blown and the proportion of rubber interblended therewith. For this purpose, butadiene-styrene synthetic rubber, i.e., GRS, has been found to be somewhat less effective than neoprene in most instances.

A rubberized blown asphalt having especially advantageous properties has been prepared in accordance with the present process by air-blowing at a temperature of about 450° F. an asphalt flux having an initial viscosity of 110 SFS, and in which 1.5% $P_2O_5$ catalyst was incorporated, to a softening point of 145° F. and interblending therewith 3% of neoprene rubber 735 by the procedure used in the foregoing examples. The product thus produced was found to pass satisfactorily the bonding test and all other requirements of Federal Specification SS-S-164 for Sealer: Hot Poured Type for Joints in Concrete. The characteristics of the blown asphalt prior to rubberizing and of the resultant rubberized blown asphalt and Specification SS-S-164 are set forth in the following tabulation.

*Table II*

|  | Unrubberized blown asphalt | Rubberized Product | Spec. SS-S-164 |
|---|---|---|---|
| Softening point, °F | 145 | 192 |  |
| Penetration at 77° F | 144 | 98 |  |
| Penetration at 32° F | 81 | 63 |  |
| Penetration at 115° F | 318 | 170 |  |
| Ductility at 77° F | 8.6 | 43.3 |  |
| Ductility at 39.2° F | 8.5 | 45.3 |  |
| Viscosity at 375° F | 69 |  |  |
| Cone penetration |  | 73 | 90— |
| Bond test |  | Pass | Pass |
| Flow |  | .05 | 0.5— |

A further highly desirable product was prepared in accordance with the present invention by air-blowing at 450° F. an asphalt flux having an initial viscosity of 110 SFS, at 210° F., and containing 1.5% $P_2O_5$, until its softening point was raised to 125° F. Then 2.25% neoprene rubber 735 was interblended with the blown asphalt as previously described. The resultant product embodied the following combination of characteristics:

*Table III*

| | |
|---|---|
| Softening point _____° F__ | 167 |
| Penetration at 77° F | 138 |
| Penetration at 32° F | 85 |
| Penetration at 115° F | 263 |
| Ductility at 77° F | 81.8 |
| Ductility at 39.2° F | 35.6 |
| Cracking temperature, ° F_____Less than | —30 |

The foregoing product has been found to be especially suitable for use as a paper laminant because of its low cracking temperature and other desirable properties. It will be understood that the term "cracking temperature," as used in the foregoing tabulation, is the temperature at which paper, coated with laminant, will crack when flexed, thereby losing its effectiveness as a barrier of moisture.

By procedure similar to that just described, we have produced rubberized blown asphalts especially useful for sealing cracks in asphalt and concrete paving and having the properties set forth in the following tabulation:

*Table IV*

| | | |
|---|---|---|
| Percent rubber solids | 2.4 | 2.1 |
| Softening point, ° F | 172 | 155 |
| Penetration, 77° F | 113 | 144 |
| Penetration, 32° F | 59 | 70 |
| Penetration, 115° F | 224 | 290 |
| Ductility at 77° F | 68 | 39 |
| Ductility at 39.2° F | 36.5 | 29 |

In producing the material represented by the first column of Table IV, the latex was neoprene 635 and in producing the second composition of Table IV, the latex was neoprene 735.

It will be understood that neoprene referred to herein is a synthetic rubber-like polymer of 2-chloro-1,3-butadiene and that the 635 neoprene and the 735 neoprene are polymers of this type having the following properties:

| | 635 | 735 |
|---|---|---|
| Solid content, weight percent | 58 | 37.5 |
| Specific gravity: | | |
| As latex | 1.12 | 1.08 |
| As dry polymer | 1.23 | 1.23 |

The softening point, penetration and ductility values given herein were determined by established methods, the penetrations at 77° F. being determined for 100 gms./5 secs., those at 115° being determined for 50 gms./5 secs., those at 32° F. being determined for 200 gms./60 secs. and ductilities having been determined at 5 cms./min.

The stain tests were run by placing a sample of the composition to be tested in a ring, such as used for determining softening points, care being taken to remove all asphalt from the outside of the ring. The ring is then placed on a number 42 Whatman filter paper in a forced circulation oven and allowed to remain there for 24 hours at 75° C. The sum of the largest and smallest diameters expressed in millimeters of the stain produced on the filter paper was reported as the stain value.

Each of these products has its own unique advantages. We have found, however, that the neoprene rubber is more easily handled and has better stability at high temperatures. However, GRS rubber has been found superior with respect to low temperature ductility of the asphaltic composition.

As previously noted, our present process is not restricted to the use of any particular neoprene rubber or to any particular copolymer of butadien-styrene, such as the GRS 2006 of the preceding examples. It is applicable to copolymers of styrene and butadiene in any proportions. Further, in the broader aspect of the invention, the proportion of rubber solids dispersed in the blown asphalt may be varied over a range extending from about 0.1% to about 10%, by weight.

We claim:

1. Method of producing rubberized asphaltic compositions comprising the following steps, air blowing an asphalt flux having a viscosity within the range extending from about 40 to about 300 SFS at 210° F. and with which there is admixed a small, catalytically effective proportion of $P_2O_5$, to a softening point within the range extending from about 80° to about 165° F. and interblending the resultant blown asphalt with a rubber selected from the group consisting of natural rubber, neoprene rubber and the copolymers of butadiene and styrene by introducing the rubber in the form of an aqueous latex into a molten, highly fluid body of the blown asphalt at a point at which the asphalt is at a temperature such that the water content of the latex is flashed into steam upon contact with the asphalt thereby vigorously agitating the asphalt and quickly dispersing the rubber therein and suddenly lowering the temperature of the resultant mixture to below that at which the rubber is deleteriously affected.

2. The process of claim 1 in which the latex is introduced into a confined, flowing stream of the hot asphalt and the resultant mixture is continued as a confined flowing stream for a period sufficient to insure uniform dispersion of the rubber throughout the asphalt and is then discharged into an open vessel for disengaging the steam from the mixture.

3. The process of claim 2 in which the temperature of the asphalt at the point of contact with the latex is within the range of 450° to 600° F. and this temperature is reduced to within the range of 350° to 400° F. upon contact with the latex.

4. The process of claim 1 in which the viscosity of the flux prior to blowing is within the range of 75 to 175 SFS at 210° F.

5. The process of claim 1 in which the flux is blown to a softening point within the range of 125 to 150° F.

6. The process of claim 1 in which the proportion of rubber solid interblended with the asphalt is within the range of 0.5% to 5% by weight.

7. Method of producing rubberized asphaltic compositions comprising the following steps, air blowing an asphalt flux having a viscosity within the range extending from about 40 to about 300 SFS at 210° F. and with which there is admixed a small, catalytically effective proportion of $P_2O_5$, to a softening point within the range extending from about 80° to about 165° F. and interblending the resultant blown asphalt with rubber-like polymers of 2-chloro-1,3-butadiene by introducing the polymers in the form of an aqueous latex into a molten, highly fluid body of the blown asphalt at a point at which the asphalt is at a temperature such that the water content of the latex is flashed into steam upon contact with the asphalt thereby vigorously agitating the asphalt and quickly dispersing the rubber therein and suddenly lowering the temperature of the resultant mixture to below that at which the rubber is deleteriously affected.

8. The process of claim 7 in which the latex is introduced into a confined, flowing stream of the hot asphalt and the resultant mixture is continued as a confined flowing stream for a period sufficient to insure uniform dispersion of the rubber throughout the asphalt and is then discharged into an open vessel for disengaging the steam from the mixture.

9. The process of claim 8 in which the temperature of the asphalt at the point of contact with the latex is within the range of 450° to 600° F. and this temperature is reduced to within the range of 350° to 400° F. upon contact with the latex.

10. The process of claim 7 in which the viscosity of the flux prior to blowing is within the range of 75 to 175 SFS at 210° F.

11. The process of claim 7 in which the flux is blown to a softening point within the range of 125° to 150° F.

12. The process of claim 7 in which the proportion of rubber solid interblended with the asphalt is within the range of 0.5% to 5% by weight.

References Cited in the file of this patent

UNITED STATES PATENTS

| | | |
|---|---|---|
| 1,881,436 | Fischer | Oct. 11, 1932 |
| 2,450,756 | Hoiberg | Oct. 5, 1948 |
| 2,578,001 | Cubberley et al. | Dec. 11, 1951 |
| 2,686,166 | Taylor | Aug. 10, 1954 |
| 2,830,963 | Traxler et al. | Apr. 15, 1958 |
| 2,841,060 | Coppage | July 1, 1958 |
| 2,921,105 | Benson | Jan. 12, 1960 |
| 2,921,313 | Odasz | Jan. 12, 1960 |